Figure 1:
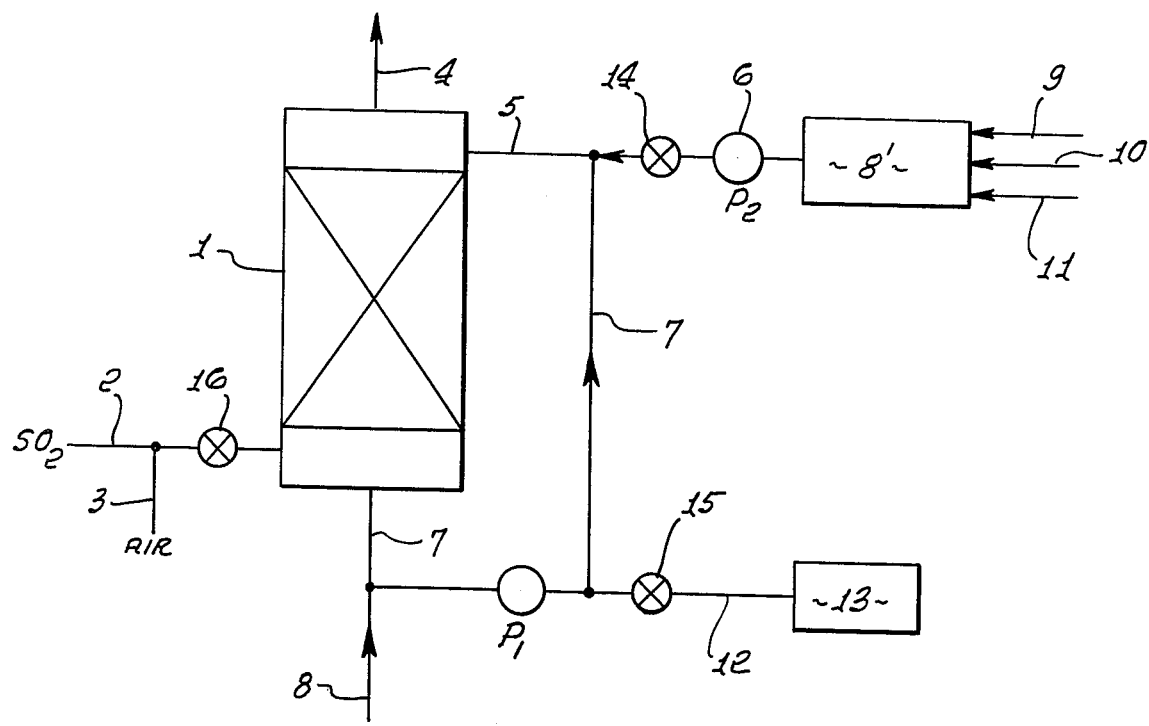

United States Patent [19]

Hasebe

[11] 4,255,400

[45] Mar. 10, 1981

[54] PROCESS FOR OXIDIZING OXIDES OF SULFUR

[75] Inventor: Nobuyasu Hasebe, Los Angeles, Calif.

[73] Assignee: New World Business Corporation, North Hollywood, Calif.

[21] Appl. No.: 921,782

[22] Filed: Jul. 3, 1978

Related U.S. Application Data

[63] Continuation-in-part of Ser. No. 804,849, Jun. 8, 1977, abandoned.

[51] Int. Cl.$^3$ .................... C01B 17/60; B01D 53/34
[52] U.S. Cl. .................................. 423/235; 423/243; 423/547
[58] Field of Search .................. 423/235, 243, 547; 260/396, 396 N

[56] References Cited

U.S. PATENT DOCUMENTS

| | | | |
|---|---|---|---|
| 2,657,119 | 10/1953 | Patton | 423/243 |
| 2,772,146 | 11/1956 | Pippig | 423/220 |
| 2911438 | 11/1959 | von Szombathy et al. | 260/396 |
| 3,928,537 | 12/1975 | Saitoh et al. | 423/243 |
| 3,937,795 | 2/1976 | Hasebe | 423/243 |
| 4,079,118 | 3/1978 | Gorai | 423/235 |

FOREIGN PATENT DOCUMENTS

| | | | |
|---|---|---|---|
| 50-59271 | 5/1975 | Japan | 423/235 |
| 51-43390 | 4/1976 | Japan | 423/235 |

*Primary Examiner*—G. O. Peters
*Attorney, Agent, or Firm*—Philip Subkow; Bernard Kriegel

[57] ABSTRACT

This invention relates to a process for catalytic oxidation of oxides of sulfur and also relates to oxidation of oxides of sulfur oxides and oxides of nitrogen.

20 Claims, 1 Drawing Figure

PROCESS FOR OXIDIZING OXIDES OF SULFUR

This application is a continuation-in-part of application Ser. No. 804,849 filed June 8, 1977 now abandoned.

BACKGROUND OF THE INVENTION

The removal of $SO_x$ (that is oxides of sulfur) from industrial waste gases such as combustion gases, both from power generating units, gas and oil heating units, internal combustion engines and regenerator gases from petroleum cracking plants and other sources which affect the quality of the air, is an ongoing problem.

It has been suggested that $SO_2$ in combustion gases may be oxidized by solutions of ferric sulfate (see U.S. Pat. No. 4,070,441, and references cited in said patent).

The Iida, et al U.S. Pat. No. 3,459,495, discloses the use of quinone compounds to convert $H_2S$ to sulfur. See also Hasebe "The Takahax Wet Desulfurization Process": CEER, pages 27 et seq, March, 1970. The Canadian Pat. No. 672,084 discloses the use for such purpose of anthroquinone disulfonic acid mixed with a metal chelated by tartaric acid or EDTA (ethylene diamine tetra acetic acid).

My U.S. Pat. No. 3,937,795, discloses the conversion of $H_2S$ to sulfur by employing quinone compounds which have been complexed with a metal. These complexes are referred to as chelates.

It has been known that the sulfite ion will adduct nitric oxide (NO). Nunes et al. "Kinetics of the Reaction of Nitric Oxide and Sulfite," Inorganic Chemistry, Vol. 9, No. 8, 1970, pp. 1916 and 1917.

GENERAL STATEMENT OF THE INVENTION

I have found that quinone compounds may be used to oxidize the $SO_3^=$ ions to $SO_4^=$ ions. In a preferred embodiment my process may be used to remove oxides of sulfur from gases containing the same by reacting the $SO_3$ ion obtained when the oxides react with water in the aqueous medium containing the quinone compound. The process is particularly applicable where the sulfur compounds present in the gas are in the form of oxides of sulfur. The removal of the $SO_2$ from gases containing the same according to my invention is particularly applicable to gases which do not contain $H_2S$, for example, such as those referred to above. Removal of the $SO_2$ is substantially entirely through an oxidation mechanism whereby the $SO_2$ is converted into $SO_3$ in the form of a sulfate anion. Some minor proportion of the $SO_2$ remains as a sulfite anion.

In a preferred embodiment I desire to employ an aqueous medium.

The quinone compound is in a form, resulting from the interaction with $SO_2$ in the aqueous medium whereby the $SO_2$ is oxidized and the compound is regenerated by oxygen into a form whereby it may be again used to oxidize the $SO_2$.

The oxidation of the $SO_2$ occurs in the presence of water. The $SO_3$ generated may be retained in the water as $SO_4^=$ or $HSO_4^-$ ions. In addition, a minor proportion of the $SO_2$ is retained as $SO_3^=$ ions or $HSO_3^-$ ions.

I prefer to employ the quinone compounds in the form of a complex with a metal capable of existing in two oxidation states. The complexes include those described in my U.S. Pat. No. 3,037,795 and therein referred to as "quino chelate". The aforesaid patent is incorporated herein by this reference.

I have discovered that such "quino chelates" when in aqueous solution containing sulfite ion will convert the NO to $NO_3^-$ ion and $N_2O$ and $N_2$.

Since gases containing $SO_2$ frequently contain NO, the process of my invention for oxidizing $SO_2$ containing gases also convert the NO.

The following description of the quinone compounds and the complexes thereof with metal is given for illustrative purposes.

The quinone compound may be a monocyclic or polycyclic compound containing the quinone or hydroquinone, that is in its dioxide form, i.e., quinone form or its hydroquinone form wherein one or more of the carbons in the ring is substituted by R, where R is H or any other radical or a multiple of radicals. Preferably R is at least one radical which imparts water solubility to the quinone compound. Such radicals, for example, include, in addition to the oxygen substituent one or more than one of the following radicals.

The acid radicals for example may be the acid radicals COOH, $SO_3H$, SH, $S-CH_2COOH$ or salts thereof.

Where the solvent contains an organic solvent which when mixed with water provides a suitable aqueous medium for the $SO_2$ or NO reactions system, I may use the quinone compound, i.e., where the substituent on the ring carbons are H or I may use substituted quinone compound which is dissolved by the organic solvent mixed with water.

The monocyclic and polycyclic quinone and their substitution products and their hydroquinone analogues, herein referred to as quinone compounds, are preferably those which are soluble in water or in an organic solvent which is sufficiently aquaphylic, to form solutions containing water.

The following water soluble quinone compounds are illustrative:

1,4 naphthoquinone or 1,4 naphthohydroquinone where R as above is one of the following substituent or substituents.

2 sulfonic acid and salts; 2 carboxylic acid and salts; 2 methyl; 2 alkylthio; 2 carboxymethyl mercapto; 2 hydroxy; 5,8 dihydroxy; 2,5,8 trihydroxy; 2,3 dihydroxy; 2,3,5,8 tetrahydroxy; 2 methoxy, and the following 1,2 naphthoquinone and 1,2 naphthohydroquinone where R above is one of the following:

4 sulfonic acid and salts; 4 carboxylic acid and salts and also 1,4,8,9 naphthodiquinone;

1,2,3,4 naphthodiquinone;

and mixtures of 1,4 naphthoquinone and 1,4 naphthohydroquinone.

The following substituted anthraquinone derivatives:
1,3 dihydroxy anthraquinone;
9-10 anthraquinone 1,6 disulfonic acid and salts;
9-10 anthraquinone 1,7 disulfonic acid and salts;
9-10 anthraquinone 1 sulfonic acid and salts;
9-10 anthraquinone 2 sulfonic acid and salts.

Those of the above quinone compounds which have redox potentials which are of above about 0.15 are preferred (see Fieser and Fieser, "Organic Chemistry", published by Reinholdt Publishing Co., copyright 1961 and U.S. Pat. No. 3,937,795).

The preferred water soluble quinone compounds is 1,4 naphthoquinone-2-sulfonic acid and ammonium or sodium or potassium salt and their naphthohydroquinone analogues.

Quinone compounds which are soluble in mixtures of organic solvents and water having a boiling point above the operating temperatures of the process preferably ethyl alcohol containing less than about 10% of alcohol, e.g., ethyl alcohol include in addition to the above water soluble compounds the following:

1,2 naphthoquinone and 1,4 naphthoquinone and their hydroquinone analogues and substituents where R above is 2,3 dimethyl; 2,5 dimethyl; 2,6 dimethyl; 5 hydroxy; 6 hydroxy; 2,5 dihydroxy; 2,6 dihydroxy; 2,7 dihydroxy; 5,6 dihydroxy; 6,7 dihydroxy; 3,5,7 trihydroxy; 2, methoxy-3-hydroxy.

The preferred quinone compound when the solvent is the above mixture of alcohol and water is naphthoquinone and its hydroquinone analogue.

Examples of quinone compounds are set forth in my U.S. Pat. No. 3,937,795 and reference may be had to the said patent, which has been incorporated into this application by reference.

The organic solvents which may be used are preferably those which may form solution of the quinone compound and contain sufficient water for the purposes of my invention as described below. They together with water and water alone are here referred as aqueous solvents or media.

Example of water soluble solvents which may be used depending on the operating temperature in the process are alcohols including the lower alkyl primary and secondary alcohols, for example, the ethyl or propyl alcohols, the glycols, for example, ethylene glycol, glycerine and the ethoxyalcohols such as 2-ethoxyethanol, amines, such as di-n-buylamine or the primary lower alkylamines.

Such solvents for dissolving the quinone compounds are described in my above patent to which reference is made.

While the quinone compounds when used in my process oxidize a substantial part of the $SO_2$ to sulfates, I prefer to employ the above quinone compounds in the form of complexes with a metal which is capable of existing in more than one oxidation state, i.e., at least two oxidation states. Such metals include those having atomic numbers 22 through 29, both inclusive and 32 through 34 both inclusive, to wit: Ti, V, Cr, Mn, Fe, Co, Ni, Cu, Ge and Se. Such complexes are herein referred to as quino chelates. Preferably I employ the metal in its $M^{++}$ or $M^{+++}$ states where M is the symbol for any of the above metals.

The preferred quino chelates are the above 1,4 naphthoquinone-2-sulfonate or its hydroquinone analogue and most preferably in the above complex thereof with Fe.

My invention is further described in connection with FIG. 1 which illustrates a schematic organization of a system for applying my process in a cyclic system.

In carrying out my process, I prefer to employ a gas-liquid contact system. FIG. 1 illustrates schematically such a system. The $SO_2$ containing gas entering at 2 of it contains sufficient $O_2$ or may be mixed at 3 with oxygen or air and passed to the tower 1, counter-current to the solution containing the quino chelate recirculated from 7 which has been mixed with a base at 8. The solution is pumped by pump $P_1$, a side stream is removed at 12 controlled by valve 15 to pass to a means at 13 for separating sulfates and sulfites formed in the process from the quinone. Instead of adding the base prior to withdrawing the side stream at 12, the base may be added to the circulating stream after removal of the side stream.

The system is charged by introducing the quino chelate by Pump $P_2$ through 6 controlled by valve 14 from the quino chelate system 8'. The quino chelate is formed in 8' by the herein reaction between a quinone compound as described above and a precursor as described below.

The quino chelate may also be periodically or continually supplied as material is withdrawn via 12.

The tower may be a packed tower or a tray tower suitable for gas and liquid contact to reduce channeling. I prefer to use the tower described in my copending application Ser. No. 804,849 which is herewith incorporated by this reference.

The chelate may be formed in the tower by adding the several reactants to the tower as described below prior to the introduction of the $SO_2$ gas and the reaction to form the chelate is carried out in the tower by continuous recirculation of the reactants valves 14 and 15, 16 being closed. The chelate however may be formed separately as in 8' and charged to the tower.

With quino chelate circulating in the tower, $SO_2$ and the oxygen pass counter-currently to the descending quino chelate solution. The pH adjacent the entrance of the $SO_2$ is acidic for example, about 4 to about 5. The withdrawn solution is mixed with a base, for example, $NH_4OH$, $NaOH$, $NH_4HCO_3$ or $NaHCO_3$ to at least partially neutralize the acid medium, e.g., establish a pH at above about 7, for example, between 6.5 and 8 and is recirculated to the top of the tower. The cation used to establish the pH depends on the level of the pH to be established in order to avoid excessive precipitation of Fe as the hydrated oxide. Employing the ammonium ion, I may increase the pH to a level higher than when using alkali metal cations. However as will be described below even when using the alkali metal cation and some of the Fe is precipitated, it will be redesolved when the pH of the system falls below the precipitation point of the Fe.

For the above reason I prefer to use the $NH_4$ ion to form any quino chelate salt and as a pH adjustment.

The ratio of the quino chelate to the $SO_2$ employed is sufficient to provide above about one and preferably more than one gram atom of the metal per mole of $SO_2$ reacting.

The process establishes an acid zone in the lower part of the tower and a substantially neutral or weakly alkaline zone, i.e., about 6.5 to 8 in the upper part of the tower. The temperature in the tower may be ambient temperature or higher such as about 100° to 200° F. where the gases are hot.

In passing through the tower $SO_2$ is oxidized to $SO_4^=$ and the gas substantially entirely free of $(SO)_x$, i.e., oxides of sulfur is removed at 4.

The extracted stream at 12 contains the sulfate and a minor proportion of sulfite salts and quino chelate.

The sulfate and sulfite salts may be separated from the mixture by suitable crystallization procedures or by reliance on the different solubility of quino chelate and the salts or the solution may be discarded.

The quino chelate whether formed at 8' or in the towers is formed by digesting a quino compound at a suitable pH with the selected metal in the form of salt or as a metal chelate, here and in my said patent referred to as a "precursor". The precursor may be in the form of a salt of or complex with an aliphatic poly carboxylic acid or hydroxy mono or poly carboxylic acid such as oxalic, citric, tartaric, glutaric, glycolic, maleic or malic acid with the malic acid salt preferred.

I may employ the chelates of the metals formed of a chelating compound, which are known in the art, to act as the precursor. These include, for example, the chelates in which the chelating compounds is amino polyacetic acid; for example, ethylene diaminotetracetic acid (EDTA) or its analogues, e.g., diethylenetriamino penta acetic acid (DEPA) or nitrolotriacetic acid (NTA), N(hydroxyethyl) ethylene diamine tetra acetic acid (NEDTA), depending on the metal ligand. The chelating properties of these amino polyacetic acids are well known.

In carrying out the chelate formation, the procedure described in my said patent employing the precursor and the quinone compounds such as those described above may be used.

For the purpose of my present invention, I prefer to complex from about 2 to about 4 mols of the quinone compound per gram atom of the metal at a pH as described above which will not convert the metal of the salt or chelate employed in the reaction, to form the quino chelate, into an insoluble compound as for example, its hydrated oxide.

The mixture of the precursor and the quinone compound in a suitable aqueous solvent at a suitable pH depending on the metal ligand is digested for a time sufficient to form the quino chelate. The exact structure of the quino chelate has not been established. For a metal capable of existing in a divalent and trivalent state such as Fe, a suitable molar ratio of the chelating quinone compound to the metal ligand is from about 2 to about 4.

For purposes of illustrating my invention I symbolize the chelate formed from a quinone compound in its quinone state, i.e., dioxide state as $[(Q.).M]$ where Q is the quinone compound and when in its hydroquinone, dihydroxy state as $[(HQ).M]$ where M represents the ligand in its appropriate oxidation state.

The quino chelate may be formed as illustrated in FIG. 1 in a separate reaction zone. $8'$. The quinone is added at 9, the precursor is added at 10 and solvent adjusted to a pH to establish the necessary pH in zone $8'$ is added at 11. The mixture is agitated and held at a suitable temperature, for example, 65° F. to 212° F. for a time sufficient to form the quino chelate. The quino chelate may then be charged to the tower 1 to supply the circulating reactant to convert the $SO_2$ and also NO if present. The ratio of the quino chelate to the $SO_2$ is preferably in excess of one mol of the quino chelate per mole of $SO_2$ in the reaction and where NO is present an additional amount of quino chelate in excess of one mole per mole of NO.

Instead of forming the quino chelate as a separate operation and introducing the quino chelate into the tower as described above the chelate may be formed in the tower 1 as a preliminary step as described above.

The purpose of further illustrating the formation of the quino chelate the following preferred embodiment is given merely by way of an example and not as limitation of my invention.

EXAMPLE 1

4 moles of 1,4 naphthohydroquinone sulfonate ($NHQ-SO_3X$), where X is $NH_4$, is dissolved in water and mixed with one mole of ferrous maliate at a pH of about 6 to about 7 and heated to a temperature of 140° F. for about five hours until about 80% of the Fe becomes complexed as is evidence by the amount of the Fe which is precipitated as sulfide when $H_2S$ is passed through a sample of the mixture at the end of the treatment.

The above chelate may be symbolized where $NH_4$ is the cation.

$$[(NHQ)SO_3NH_4]Fe^{++}$$

While I may employ this quinone compound per se, that is not as a quino chelate, to oxidize the $SO_2$ in the process as described above, the rate of oxidation and efficiency of the oxidation of the $SO_2$ to the sulfate and the percent of the $SO_2$ that is transformed into sulfate is materially improved where the quinone compound is employed in the chelated form. The following example illustrates the application of the quinone compound in its form as a quino chelate, in the process of my invention.

EXAMPLE 2

A combustion gas had the following composition:
$SO_2 = 0.3\%$ by volume;
$NO = 0.05\%$ by volume;
$CO_2 = 5\%$ by volume.

The remainder substantially was oxygen and nitrogen. The gas at a temperature of about 140° F. was passed into a column such as shown in FIG. 1. A water solution of 1,2 naphthohydroquinone-2-ammonium sulfonate ferrous chelate $(NHQSO_3NH_4)_{2-4}Fe^{++}$ formed as in Example 1, in concentration in the solution sufficient to establish one gram atom Fe per kilolite, was employed.

The quino chelate entered the tower at about 160° F. to about 170° F. The gas rate was 1.5 liters per minute. The ratio of the liquid to gas rates was 10 liters of quino chelate solution per cubic meter of gas measured at stranded conditions.

The pH at the bottom of the tower was between 4 and 5. Sufficient ammonium hydroxide was added to the recirculated solution to establish a pH of about 8 at the top of the tower.

The gas exiting the tower contained 54 parts per million of $SO_2$ and 10 parts per million of NO. The removal efficiency for $SO_2$ was 98.2% and for NO it was 98%.

EXAMPLE 3

The quino chelate in this example was formed by reaction of EDTA $Fe^{++}$ chelate with the quinone compound as in Example 1 using the same ratios of $Fe^{++}$ to the quinone compound as in Example 1, i.e., 4 moles of the quinone compound per gram atom of Fe, under substantially the same reaction conditions.

The gas of compounds as set forth in Example 2 was passed through the tower as explained above. The concentration of the quino chelate expressed as Fe was 3 gram atoms of Fe per kiloliter at pH of about 7.9. The quino chelate solution circulation rate was 7 liters per cubic meter of the entering gas at standard conditions. The temperature of the entering gas was 248° F. and that of the entering quino chelate solution was about 122° F. The exiting gas contained 2 parts per million of $SO_2$ and 2.5 parts per million of NO. The removal efficiency for $SO_2$ was 99.9% and for NO was 99.5%.

While I do not wish to be bound by any theory of the chemistry of my process, the observed facts are consistent with the following reaction scheme.

The reaction occurring adjacent the zone of entrance of the quino chelate is in a nearly neutral system as described above. The composition of the solution in the tower becomes progressively more acid towards the gas entrance as described above.

The chelate of the quinone compound is in the hydroquinone form $[(NHQ)_{2-4}M^{++}]$, with the metal in the lower valence state, in the upper part of the tower and is in the dioxide state $[(NQ)_{2-4}M^{+++}]$ with the metal in the higher oxidation state in the acid zone adjacent the gas entrance. The transformation of the quinone results in an oxidation of $SO_3^=$ to $SO_4^=$ and of the NO, if present to $NO_3$, $N_2O$ and nitrogen.

The compound in its hydroquinone state complexed with the metal in its lower oxidation state is oxidized by the air to form the chelate in the dioxide, i.e., quinone state with the metal in its higher oxidation state and is reduced in the reaction with the sulfite ion solution to the hydroquinone state with the metal in the lower oxidation state suitable for recirculation to the top of the tower 1. Additional $NH_4^+$ is added to adjust the pH to the value stated above.

It is believed that in the process hydrogen dioxide is formed and nascent oxygen derived from the hydrogen dioxide is the mechanism whereby the $SO_3$ ion is oxidized to $SO_4$ ion. The acidity of the solution produced by the entering of $SO_2$ is neutralized by the base added to the circulating solution as described above.

For purposes of illustration and explanation and not as a limitation of my invention, the chemistry of my invention, when employing the quino chelate as in Examples 2 and 3 may be symbolized as follows. The equations are for the purpose of explanation and not to establish mass balances. They are given without balancing the equations $Fe^{++} + HNQ \rightarrow Fe^{++}[HNQ]$
$Fe^{++}[HNQ] + O_2$ in air $\rightarrow Fe^{+++}[NQ] + H_2O_2$
$Fe^{+++}[NQ] + SO_2$ aq $+ O$ or $O_2 + SO_4^{50}$ $H_2O \rightarrow Fe^{++}[HNQ] + 2HSO_4^-$
$Fe^{+++}[NQ] + H_2SO_3 + O$ or $O_2 + SO_4^= \rightarrow Fe^{++}[HNQ] + 2HSO_4^-$
$2HSO_4^- \rightarrow SO_4^= + H_2SO_4$
$SO_2$ aq $+ O$ or $O_2 + H_2O \rightarrow H_2SO_3$
$H_2SO_3 + O$ or $O_2 \rightarrow H_2S_2O_6 + H_2O$
$H_2S_2O_6 + H_2O \rightarrow H_2SO_3 + H_2SO_4$
$H_2S_2O_6 + O$ or $O_2 \rightarrow [H_2S_2O_8] \rightarrow H_2SO_4 + SO_4^=$ As is shown in the examples the process of my invention in addition to removing $SO_2$ from the gas also removes NO usually present in combustion gases.

While I do not wish to be bounded by any theory for the chemistry of my invention for the conversion of NO, the observed facts are consistent with the following reaction scheme.

The removal of the NO is a result of the complexing of the NO with the quinone chelate in its reduced hydroquinone state.

$[(NHQ) \cdot Fe^{++}] + x(NO) \rightarrow [(NHQ) \cdot Fe^{++}](NO)_x$

The value of x appears to be about 3.

The NO complex reacts with sulfite ion derived from the $SO_2$ to form a sulfite NO complex, for example $[(NHQ) \cdot Fe^{++}](NO)_x + (NH_4)_2SO_3 \rightarrow [(NH_4)_2SO_3] \cdot (NO)_x + [(NHQ)Fe^{++}]$
$[(NH_4)_2SO_3](NO)_x \rightarrow (NH_4)_2SO_4 + N_2 + N_2O$
$[(NH_4)_2SO_3](NO)_x + H_2O_2 \rightarrow (NH_4)_2SO_4 + NO_2$ The hydroquinone chelate is oxidized as described above.

Instead of using ammonium hydroxide or carbonate to reduce the acidity of the acid phase we may use sodium hydroxide or other suitable base to neutralize the reaction mixture and form the water soluble quinone compound.

The conversion of the $SO_2$ and NO in the above process is aided by the irradiation of the reaction mixture with visible or ultraviolet light.

I claim:

1. The process of oxidizing a sulfite ion in a solvent medium in a reaction zone comprising reacting said sulfite ion with a quinone compound in its hydroquinone state and with oxygen, converting said sulfite ion into a sulfate ion.

2. The process of oxidizing sulfites in a solvent medium into sulfates which comprises contacting, in a reaction zone, sulfites in said medium with a quinone compound in its hydroquinone state, forming sulfates in said medium and separating said medium containing sulfates and said quinone compound in its hydroquinone state from said reaction zone.

3. A process of removing $SO_2$ from gases containing the same which comprises contacting said $SO_2$ with a solvent medium containing a quinone compound in its hydroquinone state and with oxygen at an acid pH, separating gases substantially free of $SO_2$ from said medium.

4. A process of removing $SO_2$ from gases containing the same which comprises contacting said gases with a quinone compound in its hydroquinone state in a solvent medium in countercurrent passage in a reaction zone, introducing $SO_2$ and oxygen gases, at an entrance point in said reaction zone and separating gases substantially free of $SO_2$ from said reaction zone, contacting said gases in said reaction zone with the quinone compound in said medium at an acid pH forming sulfates in said medium withdrawing said medium from said reaction zone and at least partially neutralizing said medium and recirculating said at least partially neutralized medium to said reaction zone in cycles of operation.

5. A process of removing $SO_2$ from gases containing the same which comprises contacting said gases with an acidic aqueous medium containing a quinone compound in its hydroquinone state with said gases and oxygen at an acid pH, separating said medium containing said quinone compound in its hydroquinone state and sulfate ions from said contact with said gases, separating gases substantially free of $SO_2$ from said contact, recirculating at least a part of said separated medium to said reaction zone.

6. A process for removing $SO_2$ from gases containing the same which comprises contacting said gases with a quinone compound in its hydroquinone state in an aqueous medium in countercurrent passage in a reaction zone, introducing said $SO_2$ gases at an entrance zone in said reaction zone and separating gases substantially free of $SO_2$ from said reaction zone at a gas separation point in said reaction zone, contacting said gases containing said $SO_2$ with a quinone compound in its hydroquinone formed in an aqueous medium at an acid pH and with oxygen, removing said medium containing said quinone compound in its hydroquinone state, at partially neutralizing said medium and introducing said separated medium into further contact with said gases in cycles of operation.

7. The process of claim 1, 2, 3, 4, 5 or 6 in which the quinone compound is a quino chelate of a metal having at least two oxidation states.

8. The process of claim 1, 2, 3, 4, 5, or 6 in which the quinone compound is a quino chelate in which the metal is Fe.

9. The process of claim 1, 2, 3, 4, 5 or 6 in which the quinone compound is a quinone chelate which when the quinone compound is in its dioxide state the metal is $Fe^{+++}$ and where the quinone compound is in its hydroquinone state the metal is $Fe^{++}$.

10. The process of claim 1, 2, 3, 4, 5 or 6 in which the medium is an aqueous medium and the quinone compound in its hydroquinone state is a 1,4 naphthohydroquinone-2-sulfonate and the metal is $Fe^{++}$.

11. A process of removing $SO_2$ and NO from gases containing the same which comprises contacting said gases with an aqueous medium containing a quinone compound in its hydroquinone state and with oxygen at an acid pH, separating gases substantially free of $SO_2$ and NO from said medium.

12. A process of removing $SO_2$ and NO from gases containing the same which comprises contacting said gases with a quinone compound in its hydroquinone state in an aqueous medium in countercurrent passage in a reaction zone, introducing the said gases at an entrance point in said reaction zone and separating gases substantially free of $SO_2$ and NO from said reaction zone, contacting said gases in said reaction zone with the quinone compound in said medium at an acid pH withdrawing said medium from said reaction zone and at least partially neutralizing said medium and recirculating said at least partially neutralized medium to said reaction zone in cycles of operation.

13. A process of removing $SO_2$ and NO from gases containing the same which comprises contacting said gases with an acidic aqueous medium containing a quinone compound in its hydroquinone state with said gases and oxygen at an acid pH, separating said medium containing said quinone compound in its hydroquinone state from said contact with said gases, separating gases substantially free of $SO_2$ and NO from said contact, recirculating at least a part of said separated medium to said reaction zone.

14. A process for removing $SO_2$ and NO from gases containing the same which comprises contacting said gases with a quinone compound in its hydroquinone state in an aqueous medium in countercurrent passage in a reaction zone, introducing said gases at an entrance zone in said reaction zone and separating gases substantially free of $SO_2$ and NO from said reaction zone at a gas separation point in said reaction zone, contacting gases containing said $SO_2$ and NO with a quinone compound in its hydroquinone form in an aqueous medium at an acid pH and with oxygen, removing said medium containing said quinone compound in its hydroquinone state, at least partially neutralizing said medium and introducing said separated medium into furter contact with said gases in cycles of operation.

15. The process of claim 11, 12, 13 or 14 in which the quinone compound is a quino chelate of a metal having at least two oxidation states.

16. The process of claim 11, 12, 13 or 14 in which the quinone compound is a quino chelate in which the metal is Fe.

17. The process of claim 11, 12, 13 or 14 in which the aqueous medium is water and the quinone chelate in its hydroquinone state is a 1,4 naphthohydroquinone-2-sulfonate and the metal is $Fe^{++}$.

18. The process of claim 11, 12, 13 or 14 in which the quinone chelate in its hydroquinone state is 1,4 naphthohydroquinone-2-sulfonate in the form of a quinone chelate in which the metal is $Fe^{++}$.

19. The process of claims 1, 2, 3, 4, 5, 6, 12, 13, or 14, in which process said quinone compound is a quino-chelate in its hydroquinone state and the metal of the chelate is in its reduced state which comprises oxidizing said chelate to its quinone state and the metal to its higher oxidation state and then reducing said chelate to its hydroquinone state and the metal of the chelate to its lower oxidation state and converting said $SO_2$ to sulfate ions in cycles of operation.

20. The process of claims 1, 2, 3, 4, 5, 6, 12, 13, or 14, in which said quinone is a quino-chelate which contains iron in its ferrous state and the quinone compound in its hydroquinone state which comprises oxidizing said quino-chelate to form the chelate in its quinone state and the iron in its ferric state and thereafter reducing the iron to its ferrous state and the quinone to its hydroquinone state and converting said $SO_2$ to sulfate ions in cycles of operation.

* * * * *